Oct. 14, 1958 C. F. FITTER ET AL 2,855,822
NEGATIVE HOLDER
Filed Jan. 27, 1955 3 Sheets-Sheet 1

Charles F. Fitter
Thomas G. Spezio
INVENTORS
BY
ATTORNEYS

Oct. 14, 1958     C. F. FITTER ET AL     2,855,822
NEGATIVE HOLDER
Filed Jan. 27, 1955                             3 Sheets-Sheet 2
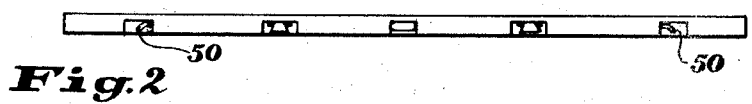
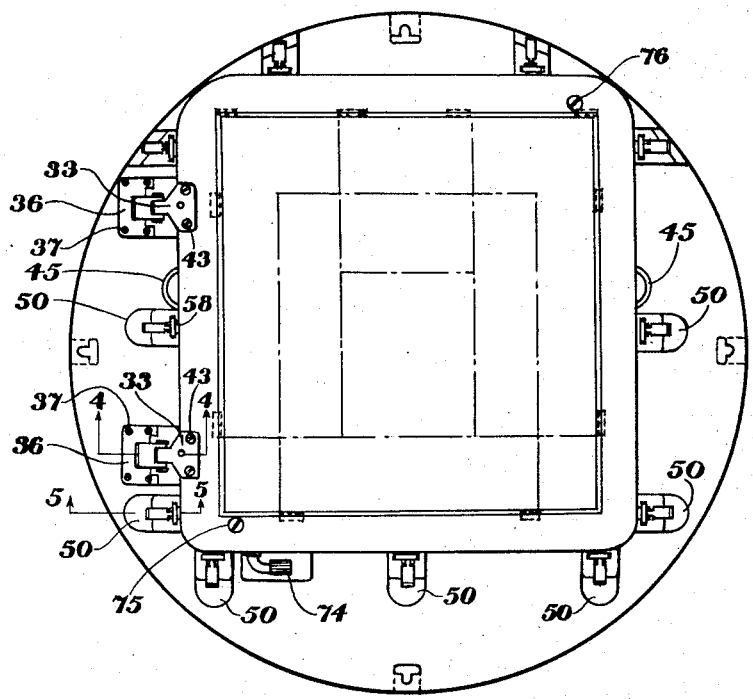
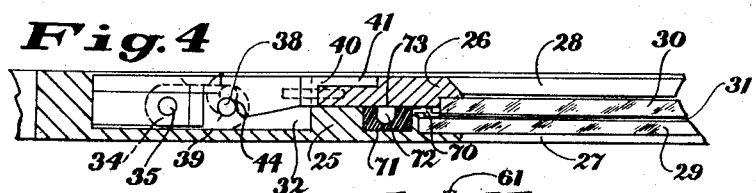
Charles F. Fitter
Thomas G. Spezio
INVENTORS Oct. 14, 1958   C. F. FITTER ET AL   2,855,822
NEGATIVE HOLDER
Filed Jan. 27, 1955   3 Sheets-Sheet 3
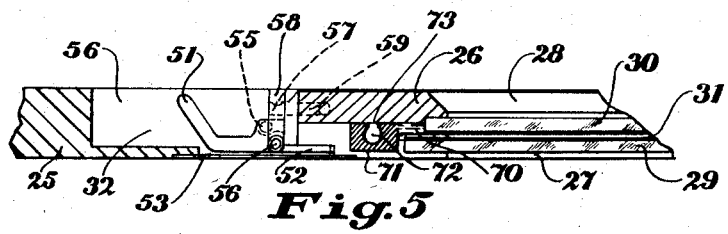
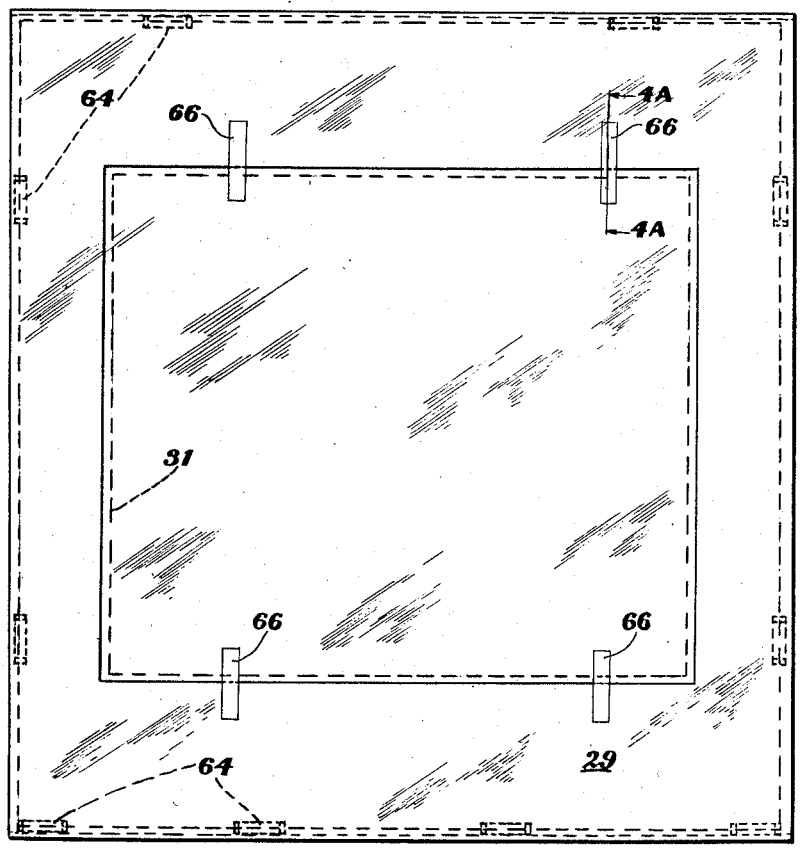
Fig.6
Charles F. Fitter
Thomas G. Spezio
INVENTORS
BY
ATTORNEYS

United States Patent Office 2,855,822
Patented Oct. 14, 1958

2,855,822

NEGATIVE HOLDER

Charles F. Fitter and Thomas G. Spezio, Rochester, N. Y., assignors to Eastman Kodak Company, Rochester, N. Y., a corporation of New Jersey Application January 27, 1955, Serial No. 484,378

3 Claims. (Cl. 88—24)

The present invention relates to photography, and more particularly to a negative holder for use in an optical projector.

As is well known in the art, film transparencies, such as negatives, may develop scratches, abrasions or other undesirable defects which will be projected along with the projected image, and are undesirable for obvious reasons. These defects are particularly troublesome when an enlarged image is projected. In order to eliminate, or at least reduce, the undesirable effects which results from the projection of these defects, various remedies have been tried such, for example, as applying a transparent coating to the film or transparency. While these remedies have been somewhat successful, they have not been all that is desired. In order to meet this problem effectively, the present invention surrounds the film negative or transparency with a suitable clear light-transmitting solution or liquid which has an index of refraction which matches that of the film. Such solution may be carbontetrachloride; a silicone material known as "Refractosil" put out by the General Electric Company, or any other transparent material which has an index of refraction matching that of the film and is compatible with the film emulsion. The holder with the solution surrounding the film serves to eliminate the projection of a large portion of the film scratches, abrasion, and dirt, which normally exist on a transparency. The result is a high quality print which requires a minimum of hard retouching.

When the image is projected vertically, the desired results can be achieved easily merely by placing the film or transparency in a bath of the solution. The film will lie horizontally and will be in proper position relative to the lens. However, it is often desirable to arrange the transparency for horizontal position. In this case, it is not only necessary to maintain layers of the liquid on opposite sides of the film, to eliminate projection of the scratches, but also to hold or restrict the motion of the film along the optical axis of the lens so as to hold the film within the acceptable tolerance for the depth of focus of the projecting lens.

These desirable results are secured by the holder of the present invention in which the film is held between a pair of glass plates which are so spaced that the solution will flow freely around both sides of the film without producing air holes or dry spots, the advantages of which are deemed obvious. At the same time, the plates are so spaced in a direction normal to the plates so as to restrict the motion of the film parallel to the optical axis of the projection lens so that any position shift along said axis is well within the acceptable tolerance for the depth of focus of the lens. In this way, the liquid layers eliminate the projection of the film defects, while the plates limit the film movement to hold the latter in focus. The film may be positioned laterally in the space between the plates by means of a suitable opaque mask which is provided with a suitable cutout or projection aperture with which the image area of the film is brought into registry. The mask is held in position by crimped plastic clamps, or other suitable means, which do not restrict the film from seeking its natural position.

The principal object of the invention is the provision of a new and improved negative holder.

A further object of the invention is the provision of a negative holder which is provided with a film receiving space in which the film is surrounded by a liquid having an index of refraction matching that of the film.

Yet another object of the invention is the provision of a negative holder which is provided with a film receiving space which is thin in the direction of the axis of the projection lens so as to restrict the movement of the film in the space within the acceptable tolerance of the depth of focus of the projection lens.

Still another object of the invention is the provision of a negative holder which is simple in structure, easy to use and adjust, rugged and highly effective in use.

To these and other ends, the inventive idea relates to certain improvements and combinations of parts, all as will be hereinafter more fully described, the novel features being pointed out in the claims at the end of the specification.

In the drawings:

Fig. 2 is a side elevation view of the holder of the present invention;

Fig. 3 is a plan view of the holder constructed in accordance with the preferred embodiment of the invention;

Fig. 4 is a horizontal sectional view, taken substantially on line 4—4 of Fig. 3, showing the hinge arrangement for swingably connecting the two frame members of the holder;

Fig. 4A is a partial sectional view through the holder, and taken substantially on line 4A—4A of Fig. 6, but on a larger scale than the latter, showing the relation of the two glass plates, the mask, film and the liquid which surrounds the film;

Fig. 5 is a horizontal sectional view taken substantially on line 5—5 of Fig. 3, showing the clamping or sealing arrangement for the two frame members of the holder;

Fig. 6 is a front view of the two glass plates, detached from the frame member, showing the relation of the spacing members for the mask, and the relation of the apertured mask, the film and the glass plates;

Fig. 7 is a side elevation view of the structure illustrated in Fig. 6, showing the relation of the plates, mask and film, and the space surrounding the film in which liquid is positioned.

Similar reference numerals throughout the various views illustrate the same parts.

Figure 1:
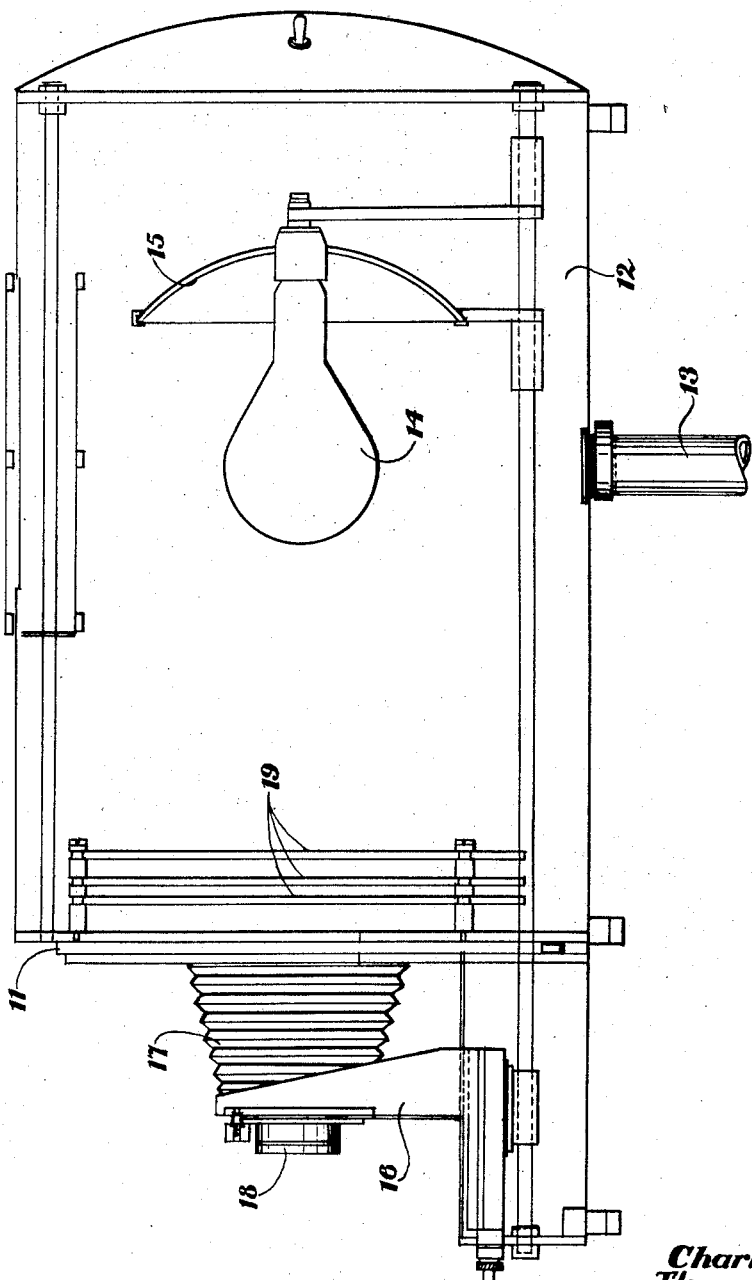
Fig. 1 is a side elevation view of a projector with the side plate removed, showing the relation of the parts and the position of the negative holder of the present invention.

Fig. 1 of the drawings shows, by way of illustration only, one form of an optical projector adapted for use with the negative holder of the present member, broadly illustrated by the numeral 11. The projector comprises, broadly, a lamphouse 12 which may be supported by a post 13 or other suitable device. The lamphouse has positioned within one end thereof a light source, such as a lamp 14, behind which a reflector 15 may be arranged. An adjustable lens plate 16 is positioned in front of the lamphouse 12 and is connected to the latter by a bellows 17. The lens-board 16 carries the projector lens 18. If desired, light filters or similar light altering members 19 may be positioned within the lamphouse 12 between the light source 14 and the negative holder 11. As the projection device forms no part of the present invention, further details are not deemed necessary. Also, the showing of the particular form is for illustrative purposes only and is not intended as a limitation as the holder of the present invention can be used with a wide variety of projector designs.

The film holder comprises a pair of frame members 25 and 26 adapted to be arranged in overlying relation and provided with registering apertures 27 and 28, which are covered with sheets of glass 29 and 30, or other suitable transparent material. The frame members 25 and 26 are preferably circular in shape so that the holder 11 may be rotated relative to the projector to position the image of the film in the holder in the desired relation on the easel or image receiving surface, not shown. The two frame members 25 and 26 are preferably hingedly connected so that they may be separated to position the film 31 between the glass plates 29 and 30, and may then be moved toward each other to close the holder to retain the film in place, all as will be hereinafter more fully described.

To secure this result, one of the frame members, for example, member 25 is provided with a pair of aligned recesses 32 in which the hinge members broadly designated by the numeral 33, are arranged, see Fig. 4, so that the hinged members are positioned below the top of the holder so as not to interfere with the positioning of the holder in and the removal of the holder from the projector. Each hinge comprises a link 34 mounted for swinging movement about a pintle or pivot 35 carried by a plate 36 secured in place in one of the recesses 32 by screw 37 or other fastening means, as shown in Figs. 3 and 4. The free or right end of link 34, Fig. 4, carried a pin 38 the ends of which are carried by bifurcation 39 of link 34. The other frame member 26 has a pair of brackets 40 secured in rabbeted recesses 41 on the top surface of member 26 by means of screws 43, or other suitable fastening means. The left end of each bracket 40, Fig. 4, is formed with an open end slot 44 adapted to engage over pin 38 to connect member 26 hingedly to member 25, as is deemed apparent from an inspection of Fig. 4. This structure gives a double swivel hinge in which member 26 may pivot or rock about pin 38 and/or member 26 and link 34 may pivot about pin 35. By placing the fingers in the opposite depressions 45 in member 25 and lifting upward, the member 26 can be separated and lifted completely from member 25. However, on lifting on the right side only of member 26 Fig. 3, the latter attaches itself to pin 38 and this member 26 hinges relative to member 25.

When the member 26 is swung about its above-described hinges to move the members to closed position, as shown in Figs. 4 and 5, the parts are clamped tightly together by means of a plurality of clamps, broadly designated by the numeral 50, Fig. 3. Each clamp 50 comprises a substantially L-shaped member having a slightly inclined portion 51 which acts as a handle, and a flat horizontal portion 52 which lies against the bottom 53 of a recess 32 formed in the lower member 25, as clearly illustrated in Figs. 3 and 5. The portion 52 carries a pin 55 which is journalled in the opposite side walls 56 of the recess 32 so that the clamp 50 may swing. Just to the right and slightly below pin 55, Fig. 5, the portion 52 carries a pin 56 the ends of which are secured to the free ends of the arms 57 of an inverted U-shaped hasp. The latter has a cross member 58 which engages a rearwardly extending member 59 on the upper member 26. Each clamp operates as follows: When the clamp 50 is swung clockwise about pin 50, the pin 56 swings clockwise about pin 55 and raises to lift member 58 to disconnect the latter from member 59. However, when the clamp 50 is swung counterclockwise, the pin 56 moves counterclockwise and downward. Such downward movement of pin 56 draws the U-shaped hasp downward to bring member 58 into engaging relation with member 59 to move member 26 down against member 25, as shown in Fig. 5.

Referring to Figs. 4, 4A, 5 and 7, it is seen that the glass plates 29 and 30, when in closed position, are separated slightly in a direction normal to the plates to provide a thin space 60, in which is positioned an opaque masking member 61 provided with an aperture 62, a film 31 positioned relative to the aperture 62. The masking member 61 is supported at its edges on crimped plastic member 64 positioned adjacent the edges of the glass plates, as clearly illustrated in Figs. 6 and 7. The members 64 space the masking member 61 from the plates 29 and 30, as shown in Figs. 7 and 4A. The film 31 is positioned on one side 65 of the masking member with the image area of the film in registry with the aperture 62 of the masking member. Strips 66 of adhesive tape or other similar adhesive strips serve to secure the film 31 to the side 65 of the mask 61 and in proper relation to the aperture 62 thereof. Thus, the masking member 61 and the film 31 are positioned in the space 60, and with the exception of the margins of the masking member contacting member 64, are out of contact with the plates 29 and 30, as clearly illustrated in Figs. 4A and 7. The space 60 is then filled with a transparent light transmitting liquid which has an index of refraction which matches that of the film 31. This liquid may be of the type described above. The liquid surrounds the film 31 and provides a thin layer 68 between the film and the plate 29 and a thin layer 69 between the film and plate 30. Thus, a thin layer of the refractive index-matching liquid or solution is positioned between the film and the adjacent glass plates. This layer of refractive liquid serves to eliminate the projection of a large portion of the film scratches, abrasion, dirt, etc. As noted in Figs. 4 and 5, the glass plate 29 is slightly larger than plate 30 to afford a small marginal channel 70 at the edge of plate 30.

In order to retain the liquid in the space 60 and channel 70, the member 25 is provided with a rectangular recess 71 in which is positioned a suitable gasket 72 of the shape shown in Figs. 4 and 5. When the frame members 25 and 26 are in closed position, the clamps 50 cause an adjacent area on the under surface 73 of the upper member 25 to press on the gasket 72 with sufficient force to provide a liquid tight seal to retain the liquid in channel 70 and space 60.

The channel 70 and space 60 may be filled with the above-described liquid through an inlet cock 74 which is in liquid communication with channel 70, and the latter is vented through opening 75. When cock 74 is used as an outlet in emptying the liquid, opening 76 is used as a vent for channel 70.

The structure of the above-described negative holder enables the latter to be used in the horizontal or vertical position or any position therebetween. Also, the holder may be rotated relative to the projector to bring the projected image into proper relation. In all cases, a layer of the fluid is positioned on each side of the film to eliminate the projection of certain film defects. Also, the space 60 between the glass plates 29 and 30 is thin enough to restrict any possible motion of the film parallel to the optical axis of the lens, so that shifting of a film is well within the acceptable tolerance of the depth of focus of the projected lens with the result that the film is always in focus with the lens, the advantages of which are deemed apparent. The crimped plastic spacers 64 provide means for holding the mask 61 and film 31 in any desired position while the holder is being rotated. Also, the spacers allow the liquid to be effective on both sides of the film. In addition, the aperture 62 of mask 61 may be positioned to project any desired portion of the film image.

In eliminating the projection of the various film defects, such as scratches and abrasion, a higher quality print results, and the requirement for hand retouching is reduced to a minimum. Also, by permitting the liquid to flow around the film, air holes and Newton rings are prevented.

While one embodiment of the invention has been described, the application is not to be limited to the precise details described, but is intended to cover all variations and modifications thereof which fall within the scope of the appended claims.

What we claim and desire to secure by Letters Patent of the United States is:

1. A negative holder for use with an optical projector having a projection lens comprising a pair of apertured frame members arranged in overlying relation, parallel glass plates covering said apertures and separated in a direction normal to said plates to provide a space to receive a sheet film, means for sealing said space, said plates being spaced from each other a distance such as to restrict movement of said film parallel to the optical axis of said lens to an amount within the tolerance of the depth of focus of said lens, an apertured masking member positioned in said space, means to retain said member out of contact with said plates, means to position said film in said space and relative to the aperture of said member and out of contact with said plates, and to light transmitting liquid surrounding said film and positioned between the latter and said plates, means to attach said film to said member so as to be supported thereby in proper relation to the aperture thereof and in said space and out of contact with plates, and a light transmitting liquid having an index of refracion matching said film positioned in said space and surrounding said film.

2. A negative holder for use with an optical projector having a projection lens, comprising a pair of apertured frame members arranged in overlying relation, parallel glass plates covering said apertures and separated in a direction normal to said plates to provide a space to receive a sheet film, means for sealing said space, said plates being spaced from each other a distance such as to restrict movement of said film parallel to the optical axis of said lens to an amount within the tolerance of the depth of focus of said lens, an apertured masking member positioned in said space, means to retain said member out of contact with said plates, means to attach said film to said member so as to be supported thereby in proper relation to the aperture thereof and in said space and out of contact with plates, and a light transmitting liquid having an index of refraction matching said film positioned in said space and surrounding said film.

3. A negative holder for use with an optical projector having a projection lens, comprising a pair of apertured frame members arranged in overlying relation, parallel glass plates covering said apertures and separated in a direction normal to said plates to provide a space to receive a sheet film, means for sealing said space, said plates being spaced from each other a distance such as to restrict movement of said film parallel to the optical axis of said lens to an amount within the tolerance of the depth of focus of said lens, an apertured masking member positioned in said space, spacing members secured to one of said plates at the periphery thereof to support said member in said space and out of contact with said plates, means to attach said film to one side of said member so as to be supported thereby in proper relation to the aperture of said member and out of contact with said plates, and a light transmitting liquid in said space surrounding said film and having an index of refraction matching said film to eliminate the projection of scratches on the film.

References Cited in the file of this patent

UNITED STATES PATENTS

| 16,979 | Kellogg | Apr. 7, 1857 |
| 1,427,750 | Lewis | Aug. 29, 1922 |
| 2,073,287 | Sandvik | Mar. 9, 1937 |

FOREIGN PATENTS

| 324,058 | Great Britain | Jan. 16, 1930 |

OTHER REFERENCES

"Society of Motion Picture Engineers Transactions," No. 5, May 3, 1926, pages 49–55.